United States Patent [19]

Jackson

[11] Patent Number: 5,894,311
[45] Date of Patent: Apr. 13, 1999

[54] COMPUTER-BASED VISUAL DATA EVALUATION

[75] Inventor: Jerry R. Jackson, Chapel Hill, N.C.

[73] Assignee: Jerry Jackson Associates Ltd., Chapel Hill

[21] Appl. No.: 08/567,925

[22] Filed: Dec. 6, 1995

Related U.S. Application Data

[60] Provisional application No. 60/002,030, Aug. 8, 1995.

[51] Int. Cl.⁶ .................................................. G06T 1/00
[52] U.S. Cl. .......................... 345/440; 345/352; 345/356
[58] Field of Search ............................ 395/757, 346, 395/615, 140, 604; 345/139, 440, 442–443, 352, 354, 356, 357, 441; 707/104, 501, 502, 509, 514

[56] References Cited

U.S. PATENT DOCUMENTS

| | | | |
|---|---|---|---|
| 4,506,326 | 3/1985 | Shaw et al. | 395/604 |
| 4,674,043 | 6/1987 | Hernandez et al. | 364/401 |
| 4,845,653 | 7/1989 | Conrad et al. | 364/521 |
| 5,039,937 | 8/1991 | Mandt et al. | 324/121 |
| 5,091,852 | 2/1992 | Tsuchida et al. | 395/602 |
| 5,133,052 | 7/1992 | Bier et al. | 395/792 |
| 5,297,253 | 3/1994 | Miesel | 395/357 |
| 5,335,346 | 8/1994 | Fabbio | 395/606 |
| 5,404,506 | 4/1995 | Fujisawa et al. | 395/604 |
| 5,404,507 | 4/1995 | Bohm et al. | 395/604 |
| 5,414,838 | 5/1995 | Kolton et al. | 395/600 |
| 5,416,895 | 5/1995 | Anderson et al. | 395/764 |
| 5,418,950 | 5/1995 | Li et al. | 395/600 |
| 5,421,008 | 5/1995 | Banning et al. | 395/600 |
| 5,426,781 | 6/1995 | Kaplan et al. | 395/604 |
| 5,428,735 | 6/1995 | Kahl et al. | 395/349 |
| 5,428,737 | 6/1995 | Li et al. | 395/604 |
| 5,428,776 | 6/1995 | Rothfield | 395/604 |
| 5,461,708 | 10/1995 | Kahn | 390/140 |
| 5,463,731 | 10/1995 | Diec et al. | 395/339 |
| 5,535,324 | 7/1996 | Alvarez et al. | 395/764 |
| 5,546,516 | 8/1996 | Austel et al. | 345/440 |
| 5,555,409 | 9/1996 | Leenstra, Sr. et al. | 395/612 |
| 5,584,024 | 12/1996 | Shwartz | 382/100 |
| 5,608,899 | 3/1997 | Li et al. | 345/440 X |
| 5,652,842 | 7/1997 | Siegrist, Jr. et al. | 345/440 X |

OTHER PUBLICATIONS

Cowart, "Mastering Windows 3.1 Special Edition", pp. 105–109, 114, 120, 126–129, 1993.
Parsaye, et al., "Intelligent Database Tools And Applications," 1993, pp. 249–266, and 330–338.

*Primary Examiner*—Joseph H. Feild
*Attorney, Agent, or Firm*—Moore & Van Allen, PLLC

[57] ABSTRACT

The present invention is directed to a method and a system for computer-based visual data evaluation which allows on-the-fly viewing, evaluation and querying of complex databases with simple user operations. A visual chart representation of the data set is used to select for display data subsets through interaction between the user and the system within the chart of the data set. The results of the user's data subset selections are displayed in the chart. A chart of only the data subset may then be selected and displayed through interaction between the user and the system within the displayed data subset. The steps of selecting and displaying the results of data subset selections may be continued in an iterative visual data evaluation process. A record of the user selected data subsets is maintained, including a textual record of the data subset and distinct visual symbols for each of the data subsets created. The visual symbols and textual records are arranged and displayed representing the structural hierarchical relationship among the data subsets as defined by the user's data subset selection. The visual symbols may be used as software buttons for selecting for display the associated data subset and other operations. The present invention thus provides a computerized interactive method for providing visual data evaluation including browsing, querying and manipulation of data and other information within a database by providing chart representations of database data and operating only on the attributes of the chart and within the data area of the chart.

40 Claims, 12 Drawing Sheets

COMPUTER-BASED VISUAL DATA EVALUATION

This application claims benefit of USC Provisional Appl. 60/002,030, filed Aug. 8, 1995.

BACKGROUND

This invention generally relates to a process for database querying, and more particularly concerns an interactive interface for chart-based graphical data browsing, querying and manipulation.

A portion of the disclosure of this patent document pertains to material which is subject to copyright protection. The copyright owner has no objection to the facsimile reproduction by anyone of the patent document or the patent disclosure, as it appears in Patent and Trademark patent file or records once the patent issues or the file is otherwise made available to the public according to law, but otherwise reserves all copyright rights whatsoever.

Visual data evaluation is an important part of information processing. For many objectives such as pattern recognition, outlier analysis and general data exploration, human visual data evaluations are far superior to other options such as automated statistical procedures.

Visual data evaluation embodies two related activities: browsing and querying. Browsing is an information-seeking process which utilizes chart displays of data including bar charts, scatter plots and the like to detect patterns, to develop an intuitive understanding of relationships exhibited by the data and to determine the next desired chart presentation of the data. "Querying," which is a mechanism for accessing information stored in a database, specifies and selects data subsets which can then be used for additional browsing, querying or other information processing. Browsing can be considered the primary visual information gathering step while querying allows the user to "navigate" through the data.

Visual data evaluation, however, is necessarily constrained by the limits of human cognitive abilities which permit only relatively small quantities of data to be evaluated at one time. For example, a data series with one hundred observations can easily be inspected visually while one with ten thousand observations cannot. Consequently, large data series must be divided into subsets to conduct visual data evaluations. Furthermore, graphical representations quickly become confusing when a third or fourth dimension is added. Therefore, most visual data evaluation is conducted on pairs of data items or variables. Finally, the limits of human memory make it difficult to remember and process important information from more than a dozen or so data subsets or pair-wise visual evaluations.

Commercially available software can provide data manipulation, querying and charting functions required to conduct visual data evaluation. While the general class of software referred to as spreadsheet software is most suited and most frequently used to conduct these evaluations, its application is cumbersome and tedious.

Spreadsheet software represents data in a column and row tabular format. Spreadsheet data is selected for use in a chart by specifying desired columns and rows either through a series of keyboard entries or with mouse operations on the tabular data display. Chart specifications are determined with a series of choices presented in menus, dialogue boxes, or other user-interactive devices. Finally, the chart is presented in a separate display area. Changing one of the variable series presented in the chart is initiated by returning to the spreadsheet display and then repeating the data selection process and updating the chart display.

Examining a noncontiguous subset of spreadsheet data requires a separate data query to extract the desired data and place it in another area of the worksheet. Queries are performed after users specify the data to be queried, query parameters and the area in the spreadsheet that will hold the query results. The columns and rows containing the new data subset are then referenced and incorporated in new chart displays. Spreadsheet data manipulation is also often applied to compute statistics for query results at intermediate points in the evaluation. Additional charting, querying and data manipulation continue through as many additional repetitions as desired.

While the results of spreadsheet-based visual data evaluations are recognized to have substantial value, only limited evaluations can be undertaken before the detailed, cumbersome, and error-prone nature of identifying and developing new charts and keeping track of the relationships between the new queries and charts and the query and chart histories overtakes the ability of the user to interpret the information.

Commercially available database management software (DBMS) also represents data in a tabular format; however, instead of the row and column terminology, database data is generally referenced as records and fields. DBMS typically provides greater flexibility in query operations including the computation of a limited number of statistics. Although queries of great complexity may be formulated using DBMS, this software is much more difficult to use than is spreadsheet software. The standard Structured Query Language (SQL) is entered in English-like commands; however, complicated and rigorously structured syntax makes SQL querying a difficult process for users to master. Table or form-based procedures such as Query-by-Example (QBE) have been developed to convert form and table input into query results, and while these developments have decreased the burden of SQL query formulation somewhat, they certainly have not eliminated it.

More recent DBMS and spreadsheet software systems apply graphical user interface (GUI) techniques which allow users to select icons, symbols or other representations presented on the display to specify query details. While software in this later category is often said to provide "graphical" queries (applying the word "graphical" as it is used in the term GUI), a more appropriate characterization is "symbolic query". That is, the user selects symbols from the display to specify a query. Symbols include icons, tables, text, pictures and other representations which connotate data or query operations.

While symbolic systems provide a more intuitive query process than SQL thereby reducing the number of errors inexperienced SQL users might otherwise make, they still require the user to conceptually comprehend complicated database or spreadsheet processes and structures in order to master a series of detailed procedures to define query criteria and relationships.

One of the most important DBMS operations is the "join" operation which is applied to relational databases to combine data from two separate database tables into a single table for further processing. Users must specify commands in SQL text or use mouse selections in symbolic systems to select the tables to be joined and to identify the variables to be included in the resulting table. The problem with this process is that each time the user wants to combine a new set of variables from different tables or wants to include another variable in the current table, a new join operation must be completed. While the relational database approach of storing data in separate tables provides an efficient and flexible model for maintaining the physical database system, it also adds the additional burdens on the user who possess an understanding of the table structure of the database and must perform table joins each time variables are used from different tables.

DBMS also requires the same kind of detailed, sequential step-by-step data manipulation, query and charting process described for spreadsheet software. As a result, DBMS is even more difficult to use in its application to visual data evaluation. Consequently, the currently available spreadsheet and DBMS software, except in the simplest cases, is woefully inadequate in its application to visual data evaluation.

One problem that limits the value of the currently available spreadsheet and DBMS software systems in visual data evaluation is that the large number of detailed steps required in data manipulation, querying and charting severely limit the user's ability to remember and process database information.

Another problem with such software systems is that the charting process, which is the primary visual mode for presenting and discovering information, is provided only as a final visual documentation of data selection and manipulation which have already occurred rather than as an integrated part of the visual data evaluation process itself. Consequently, users do not receive interactive, visual feedback from manipulation of the database that occurs with queries and browsing activities.

Yet another problem with existing DBMS and, to a lesser degree, spreadsheet software is the complex, highly structured and non-intuitive nature of database and spreadsheet query processes and the resulting difficulty in mastering such systems.

Yet another problem with existing software systems is that separate "join" operations must be applied to data from different tables prior to accessing the data in a single combined table.

Still another problem is that the visual data evaluations quickly become confusing as the user loses an understanding of the evolution of previous graphical, statistical and query steps.

The problems with currently available software are becoming even more severe as increased use of databases and greater need for information is occurring at the same time that rapidly increasing communications networks and workstations are making these data available to users who are generally less proficient in the tools needed to efficiently and accurately access database information.

For the foregoing reasons, there is a need for a new, simpler software system for visually evaluating information in complex databases. This new system should support rather than tax human cognitive abilities throughout the data evaluation process. The system should also provide a new intuitive visual context for browsing and querying data by means other than lengthy, detailed procedures employing formal language statements or symbolic query representations. Rather, users should be able to directly view, evaluate and query data with simple operations on a single comprehensive dynamic representation of the database. Such new method should also be able to accomplish complex queries while at the same time be easily understandable to novice database users. Further, the method should also allow users to select all database variables without having to conduct separate join operations prior to accessing the data. Finally, the system must be directly applicable to a broad base of existing database systems and network environments.

SUMMARY

The present invention is directed to a method and a system that satisfies these needs. A method in a data processing system for accessing information in a data set having features of the present invention comprises the steps of creating a visual chart representation of the data set and displaying the data set in the chart, selecting a second data set which is a subset of the displayed data set through interaction between the user and the system within the chart of the data set, and displaying the results of the data subset selecting step.

The information accessing method may further comprise the steps of selecting the data subset through interaction between the user and the system within the displayed data subset and displaying a chart of the selected data subset. The steps of selecting a data subset through interaction between the user and the system within the chart of any previous data subset and displaying the results of the data subset selecting step may be continued in an iterative data evaluation process.

Further, the method of the present invention may comprise the step of maintaining a record of the selected data subsets, including associating a distinct visual symbol with each data subset record and using the visual symbol as a software button for selective viewing of the associated data subset and from which the data evaluation may be redirected.

The step of maintaining a record of the user selected data subsets may comprise the steps of creating a record of each data subset, creating and displaying a distinct visual symbol for each of the data set and the data subsets, and arranging the visual symbols in a network of interconnected visual symbols representing the structural hierarchical relationship among the data set and the data subsets as defined by the data subsets selecting step. Optionally, a record of the user selected data subsets may be maintained by creating a textual record and values of the chart attributes which define the data subsets, displaying the textual record for each of the data set and the data subsets, and arranging the textual records to represent the structural hierarchical relationship among the data set and the data subsets as defined by the data subsets selecting step.

In another aspect, the present invention comprises a method in a data processing system for maintaining a record of user selected data subsets selected from a data set comprising the steps of creating a record of the data subsets, such as a textual record of the data subsets and the values of chart attributes which define each data subset; creating and displaying a distinct visual symbol for each of the data set and the data subsets; and arranging the visual symbols in a network of interconnected visual symbols representing the structural hierarchical relationship among the data set and the data subsets as defined by the data subsets selecting step. A visual symbol may be selected for displaying visually the associated data subset. The method may further comprise the steps of maintaining and displaying simultaneously a visual chart representation of the data set, receiving and processing additional data subset selections through interaction between the user and the system within the chart of the data set, creating records of the additional data subsets, creating and displaying distinct visual symbols for each of the additional data subsets, and arranging the distinct visual symbols in a network of interconnected visual symbols to indicate the structural hierarchical relationship among the data set and the data subsets as defined by the data subsets selecting step.

Further, the present invention comprises a method in a data processing system for maintaining a record of user selected data subsets selected from a data set comprising the steps of creating a textual record and the values of chart attributes which define the data subsets, displaying the textual record for the data set and data subsets, and arranging the visual symbols to represent the structural hierarchical relationship among the data set and the data subsets as defined by the data subsets selecting step. The method may further comprise the steps of maintaining and displaying a visual chart representation of the data set, receiving and processing additional data subset selections through interaction between the user and the system within the chart of the data set, creating records of the additional data subsets, creating textual records of the additional data subsets and values of chart attributes which define the data subsets, creating and displaying distinct visual symbols for each of the additional data subsets wherein the visual symbols for data subsets in the same level of the selection hierarchy share a common feature, and arranging the textual records and displayed visual symbols to represent the structural hierarchical relationship among the data set and the data subsets as defined by the data subsets selecting step.

A data processing system for accessing information in a data set having features of the present invention comprises means for creating a visual chart representation of the data set, means for selecting a data subset which is a subset of the displayed data set through interaction between the user and the system within the chart of the data set, and means for displaying the results of the data subset selection.

The data set information accessing system may further comprise means for selecting the data subset through interaction between the user and the system within the displayed data subset and means for displaying a chart of the data subset.

A system for maintaining a record of the selected data subsets in accordance with the present invention comprises means for creating a record of each selected data subset. The record maintenance system may further comprise means for creating and displaying a distinct visual symbol for each data subset and means for arranging the visual symbols in a network of interconnected visual symbols to represent the structural hierarchical relationship among the data set and the data subsets as defined by the data subset selection.

The record maintenance system of the present invention may optionally comprise means for creating a textual and values of chart attributes which define the data set and data subsets, means for displaying the textual records, and means for arranging the textual records to represent the structural hierarchical relationship among the data set and the data subsets as defined by the data subsets selection.

Accordingly, it is an object of the present invention to provide a new method for computer-based visual data evaluation having one or more of the novel features of this invention as set forth above or hereinafter shown or described.

Another object of the present invention is to provide a new system for computer-based visual data evaluation having one or more of the novel features of this invention as set forth above or hereinafter shown or described.

It is also an object of the present invention to provide an improved computerized interactive method for providing affording visual data evaluation including browsing, querying and manipulation of data and other information within a database.

Another object of the present invention is to allow a user to conduct visual data evaluation by beginning with an initial data chart and operating only on the attributes of the chart and within the data area of the chart to provide an integrated interactive chart-based process for browsing, querying and manipulating data.

Yet another object of the present invention is to allow the user to conduct querying operations within the data area of the graphical chart display in such a way that the user "captures" the subset of data which is the object of the query by operation of a pointing device.

Further, it is an object of the present invention to provide a data browsing, querying and manipulation system wherein database table joins are automatically conducted when the user selects chart variables which reside in different tables.

Still further, it is an object of the present invention to provide an improved data querying and statistical manipulation history display which maintains the user's understanding of the evolution of graphical, statistical and relational information derived through browsing and querying activities, including query and statistics histories which are updated in real time and which can be displayed concurrently on the display.

Also it is an object of the present invention to provide chart, query and statistical histories of queries on demand.

A related object of the present invention is to allow the user to reposition the chart-based data evaluation to any previously defined position by operating on entries in the query and statistics histories.

These and other objects of the present invention are accomplished interactively and dynamically and are displayed on the computer display device in the form of textual and visual records of the query process arranged in a structural hierarchical relationship defined by the evolution of the user-generated data evaluation process.

Another feature of the present invention is to provide chart representations of database data as an integrated part of the visual data evaluation process.

Still another object of the present invention is to define chart entities as a collection of information on the data subset, chart specifications, query relationships and other information defined by chart-based user operations. The user may apply chart entities as operands in query, data manipulation and other operations.

A further feature of the present invention is use of the visual and textual records reflective of the queries as software buttons for repositioning or redirecting the evaluation to any previous point in the process.

The present invention is a simple method for visually evaluating complex databases. The method and system allows the user to access and manipulate a database in real time, viewing, evaluating and navigating, by means of a simple query process, through data presented on the display. The method and system does not require the use of a formal, structured query language. Rather, the method and system is an intuitive browsing and querying process employing simple operations on a single comprehensive dynamic representation of the database in which highly complex queries are feasible. On-the-fly viewing, evaluation and querying with simple operations are possible. The simultaneous generation of structural hierarchical summaries of the browse and query operations, and a statistical summary which reports information for each step in the user-guided browsing and querying process, prevents exhaustion of human cognitive abilities through the data evaluation process. The method also allow users to select any database variables without having to conduct separate join operations prior to accessing the data. The method and system of the present invention is applicable to a broad base of existing database systems and network environments.

BRIEF DESCRIPTION OF THE DRAWINGS

For a more complete understanding of this invention reference should now be had to the embodiment(s) illustrated in greater detail in the accompanying drawing(s) and described below by way of (an) example of the invention.

In the drawings.

DESCRIPTION

Because use of the words "graphic" and "chart" in the computer industry today, can mean a multiplicity of things many of which are highly distinguishable from each other and because it is essential to the understanding of this invention that such distinctions be readily and clearly made, specific words are defined for use herein as follows:

As used herein, the term "chart" refers to a graphical presentation of data wherein visual spatial representations are used to reflect relationships among the data presented in the chart. This definition of charts includes bar charts, scatter plots, pie charts, line charts, histograms, pert charts, maps, iconic charts and the like.

As used herein, the term "browsing" refers to an information-seeking process which utilizes chart displays of data to visually detect patterns. Browsing is often applied to develop an understanding of relationships exhibited by data and to conduct other visual considerations of data presented in charts.

An embodiment of the computer-based visual data evaluation, including data browsing, querying and data manipulation, provided by this invention has been implemented in a software application program, known as MAISY (TM), which was written in the C++ programming language for use in the Microsoft Windows (TM) operating environment.

Figure 1:
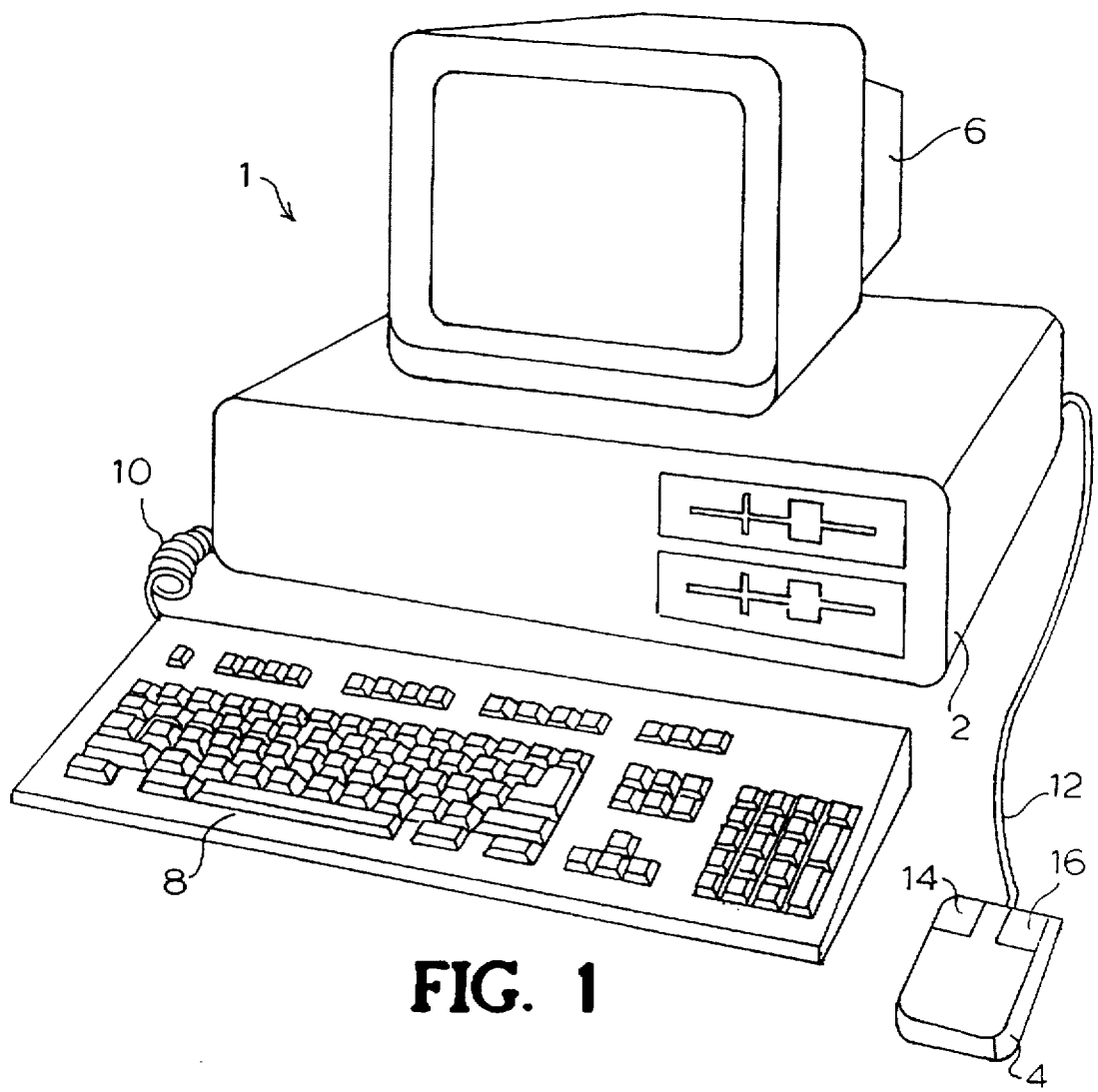
FIG. 1 is a pictorial representation of a representative hardware environment for the present invention.

A representative hardware environment for the invention is shown in FIG. 1, comprising a workstation including a data processing system generally shown at 1, which may be programmed in accordance with the present invention. The workstation includes a central processing unit, such as a conventional microprocessor 2 which includes a graphics processor, a random access memory (RAM), read only memory (ROM), a cursor controller such as a mouse pointer 4, and means for communicating into a data processing network (not shown), which may have attached thereto further databases and as well as distinct, remote workstations. Coupled to the processor 2 is a video display device 6 which may be implemented using either a color or monochromatic monitor, as is well known in the art. Also coupled to the processor is a keyboard 8. The keyboard 8 preferably comprises a standard computer keyboard which is coupled to the processor 2 by a cable 10. The workstation includes nonvolatile storage for the database, such as hard disk, optical disk, or tape drive media.

The mouse 4 is coupled to the processor 2, in a manner well known in the art, via a cable 12. As is shown, the mouse may include a left button 14, and a right button 16, each of which may be depressed, or "clicked," to provide command and control signals to the data processing system 1. While the disclosed embodiment of the present invention utilizes a mouse 4, those skilled in the art will appreciate that any graphical pointing device such as a track ball, touch pad, light pen, touch screen and the like may be utilized to implement the method of the present invention.

The goal is to provide the user of the workstation a method, system and program resources to visually evaluate data encompassing an unlimited base of information.

Figure 2:
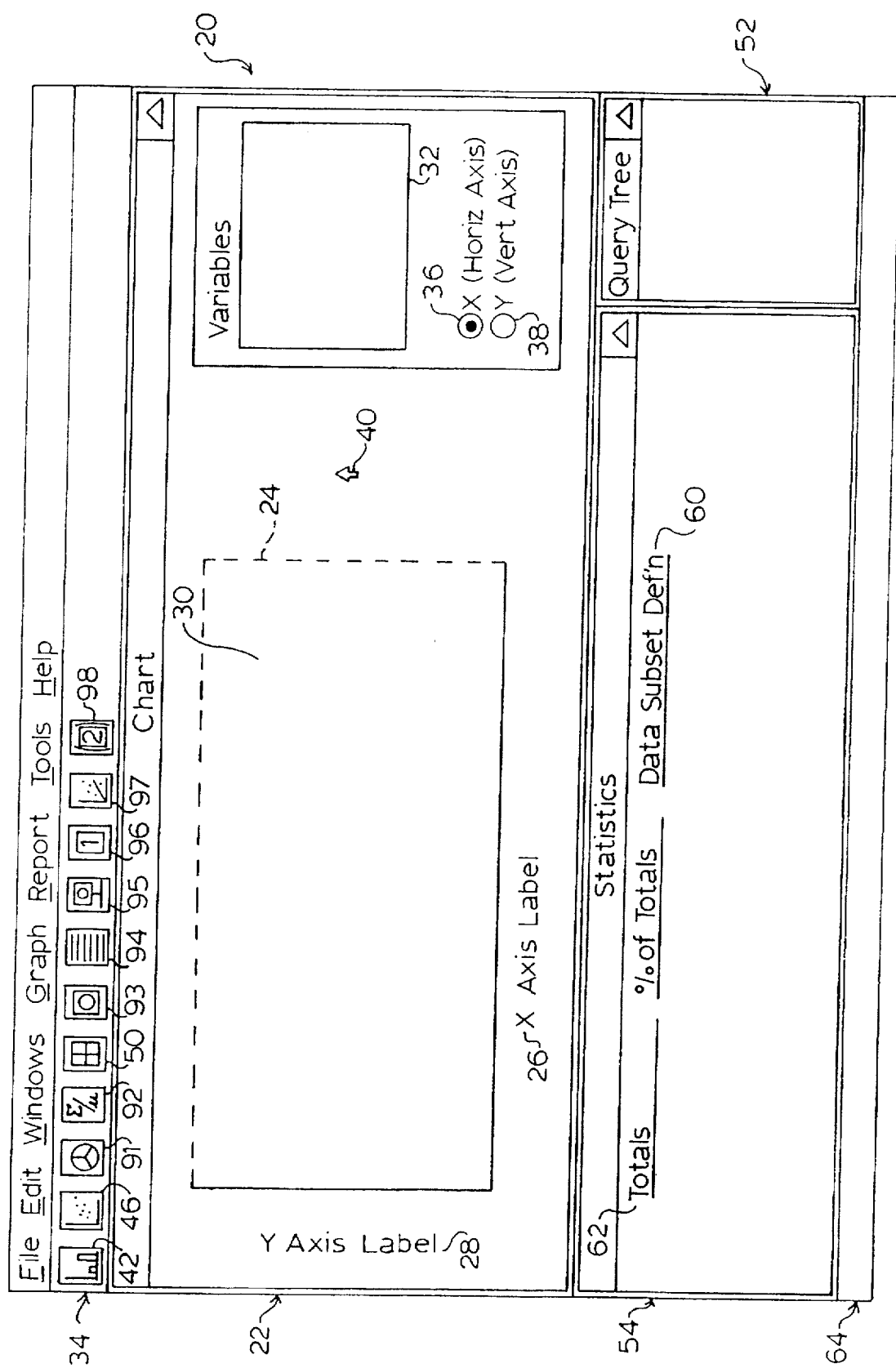
FIG. 2 shows an unpopulated or empty depiction of a display as it appears on the computer display device of a data processing system programmed according to an embodiment of the present invention.

Turning now to FIG. 2, an embodiment of the present invention, denoted generally at 20, begins with an "empty" display which includes a screen display area comprising a Chart Window 22. All visual data evaluation including browsing and querying are accomplished within the Chart Window 22 in an integrated, dynamic manner by operating with a graphic pointing device, such as the mouse 4.

The Chart Window 22 includes a chart template 24 comprising an x-axis label 26, a y-axis label 28 and a data area 30 for a chart representation of data. Other menus or representations of data variables appear in the Chart Window 22, including a variable label list box 32 of database variable labels, and an x-axis selection option button 36 and a y-axis option button 38 which identify the current axis choice. While in the preferred embodiment list boxes and option buttons are set up and operated as is typical in the Microsoft Windows operating system, as illustrated in the Microsoft Windows User Guide, it is contemplated that any suitable types of selection and option display would come within the invention.

The axes variable labels appearing in the variable list box 32 represent individual data items or variables in the database. By selecting different variables or different sets of variables for the charts, the user develops visual impressions of the data thereby identifying trends, patterns and other characterizations which transform the unprocessed database data into valuable information. The number of variables which can be evaluated and the kinds of information seeking activities are unlimited.

It is understood that this embodiment, as shown in FIG. 2, displays a chart with two dimensions. If charts of three or more dimensions are used, the option button selection area changes to accommodate the additional axis selections. Thus, multi-dimensional visual data evaluation is possible with the present invention.

Representations of predefined chart types and process options may also appear on the display with the Chart Window 22, such as for example, a tool bar of chart attribute buttons and other process controls 34. The tool bar 34 includes a number of chart attribute buttons, or icons, and icons representing process options. The tool bar 34 comprises a bar chart icon 42, a scatter plot icon 46, a pie chart icon 91, a sum/mean icon 92, a chart history window icon 50, a query node display options icon 93, a full statistics icon 94, a new tree icon 95, a query advance icon 96, a three dimensional chart icon 97 and a query node operations icon 98. Other chart attribute buttons and process options icons are possible. It is understood that the foregoing list is representative and I do not intend to so limit the present invention since modifications may be made by those skilled in the art, particularly in light of the teachings herein.

As is typical, the mouse 4 allows the user to control a cursor 40 which appears over the screen. Any of the icons in the tool bar 34 may be selected by clicking the left mouse button 14 while the cursor 40 is positioned over the desired icon. By clicking while the cursor 40 is on the icon, that particular process option function represented by the icon is selected and carried out. For example, by selecting the bar chart icon 42 the data appear in the data area 30 in a bar chart. If the scatter plot icon 46 is selected, one "dot" will appear in the data area 30 to reflect the x-axis and y-axis variable values for each record in the database. Similarly, by selecting the pie chart icon 91 the data appear in the data area 30 in a pie chart. The sum/mean attribute button 92 can be selected to toggle the display to show the category mean or total of the y-variable. The sum/mean attribute button 92 illustrates one of a number of data computations and transformations that can be applied to any of the axis variables. For instance, medians, highs, lows, standard deviations, logarithmic transformations, exponential transformations and other operations may be applied to develop additional information from the data displayed on the chart.

While the function of the remaining icons is not intuitively obvious and will be more fully described below, the following provides a brief introduction. The chart history window button 50 is an additional documentation and presentation feature of the present invention and is used to display previously developed charts selectively in a tiled graph presentation to assist in data evaluation and searches. The query node display options icon 93 and the full statistics icon 94 toggle display options between summary and full display of information. The new tree icon 95 initiates new query tree structures. The query advance icon 96 changes the current data subset designation. The three dimensional chart icon 97 illustrates one of a number of three dimensional chart types. The query node operations icon 98 supports operations accomplished with references to query tree nodes.

An embodiment of the present invention will now be described with reference to FIG.'s. 3A through 8 showing flow diagrams for various process operations. In FIG.'s. 3A through 8, the terms "x" and "y" refer to the variables that define a current data subset; data subsets are also sometimes referred to as "segments;" "display X" and "display Y" refer to variables displayed on the currently viewed chart; "LMBC" refers to a left mouse button click operation; "RMBC" refers to a right mouse button click operation; "LMBD" refers to a left mouse button down and hold operation; "LMBU" refers to a left mouse button release operation and "LMBDC" refers to a left mouse button double click operation.

Figure 3A:
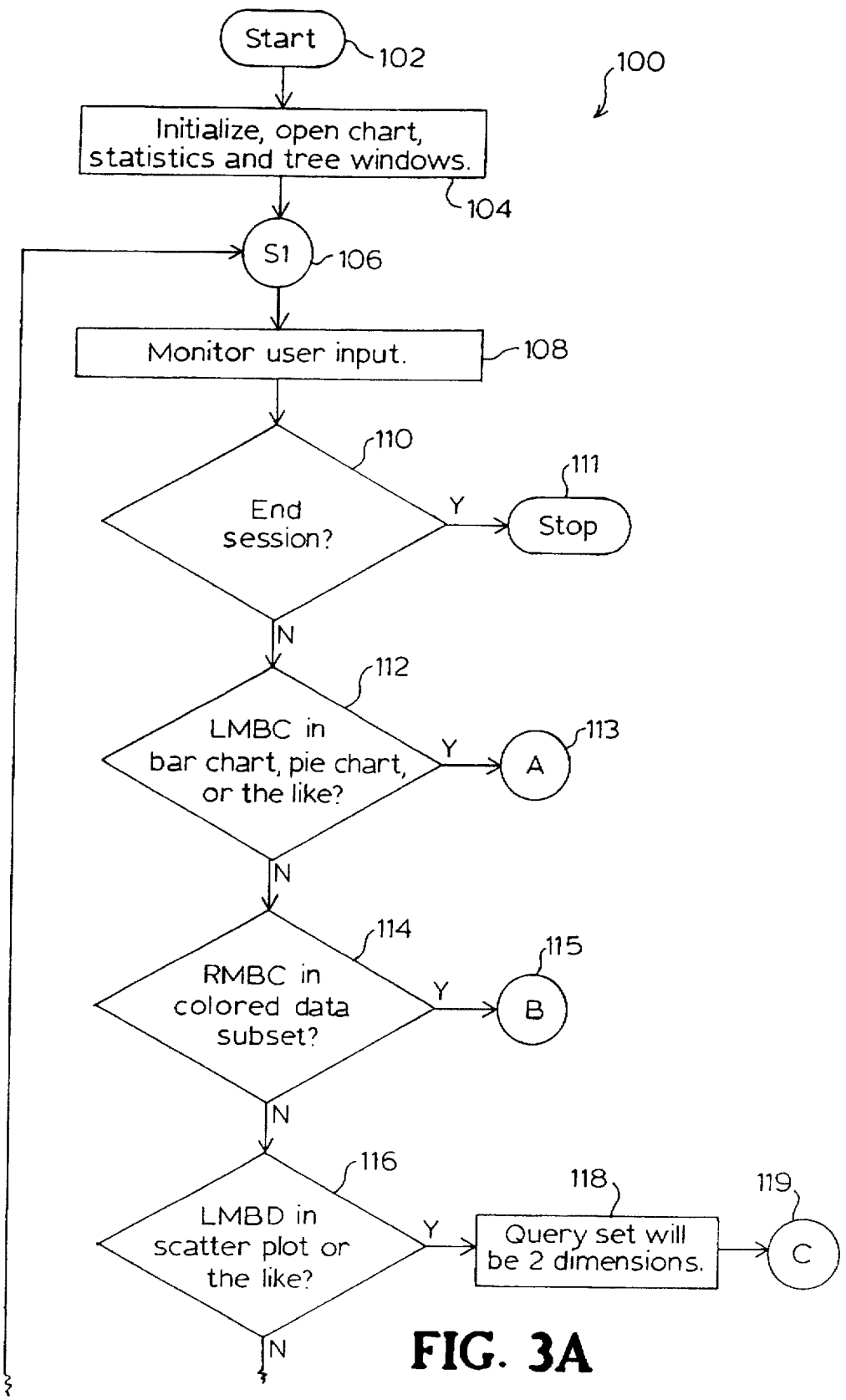
FIGS. 3A–3B, 4, 5, 6, 7 and 8 are a flow chart representations of an embodiment of the present invention.
Figure 3B:
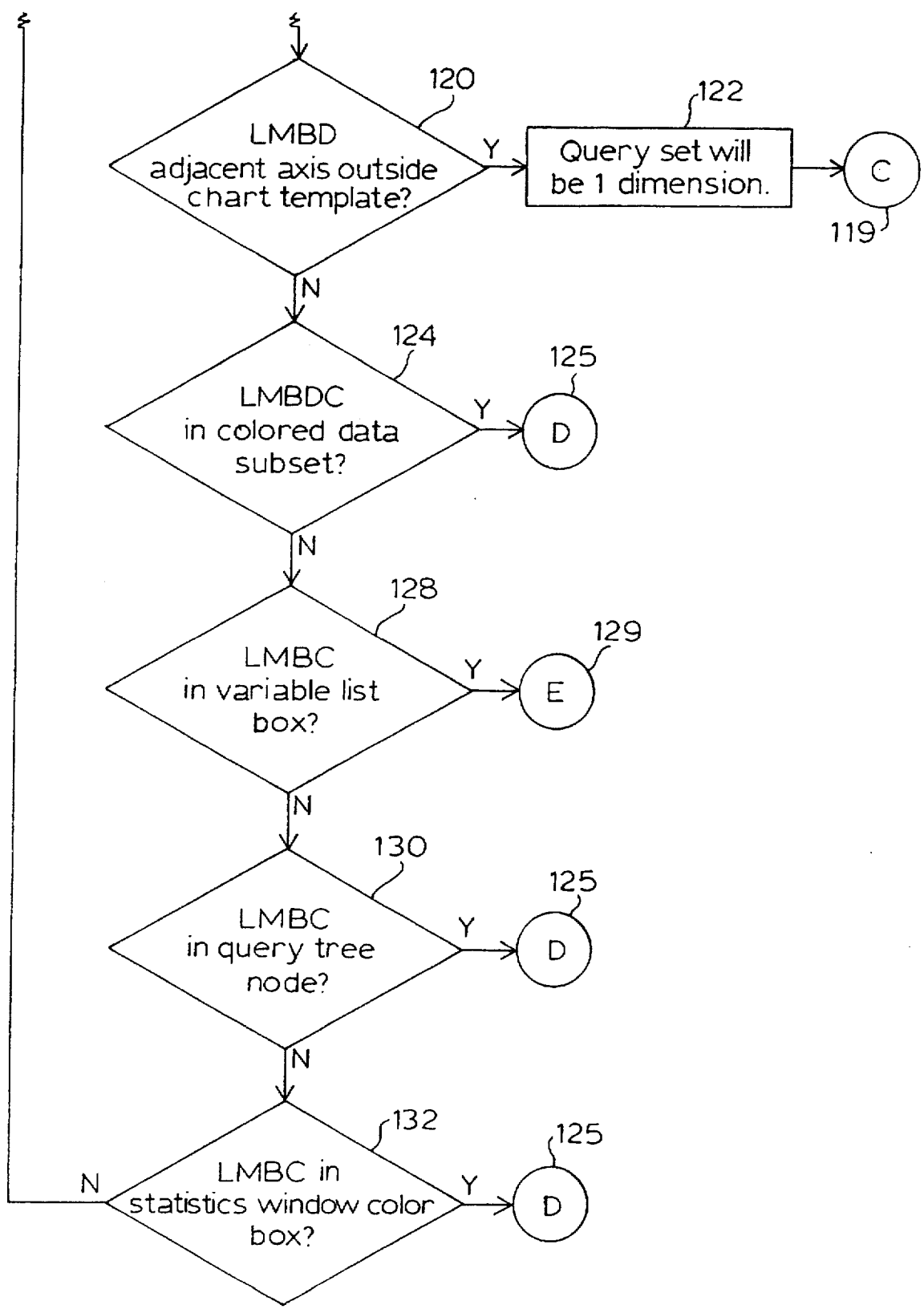

The user initializes the process 104 and populates the chart template 24 of the Chart Window 22 by selecting a chart type using the tool bar 34, such as selecting a bar chart by clicking the left mouse button on the bar chart icon 42 as described above, and by selecting variables for each chart axis from the variable label list box 32 in conjunction with the axis option button settings 36, 38. For example, by clicking on the x-axis option button 36 thereby designating the x-axis, the variable for the x-axis is selected with a left mouse button click 128 (FIG. 3B) on any of the variable labels in the variable label list box 32 changing the display X value 604 (See FIG. 8). Similarly, by clicking on the y-axis option button 38 thereby designating the y-axis, the variable for the y-axis is selected by then clicking on any of the variable labels in the variable label list box 32 changing the display Y value 606. In this manner, a y-axis variable and x-axis variable are selected and the data are used to populate the chart.

Figure 8:
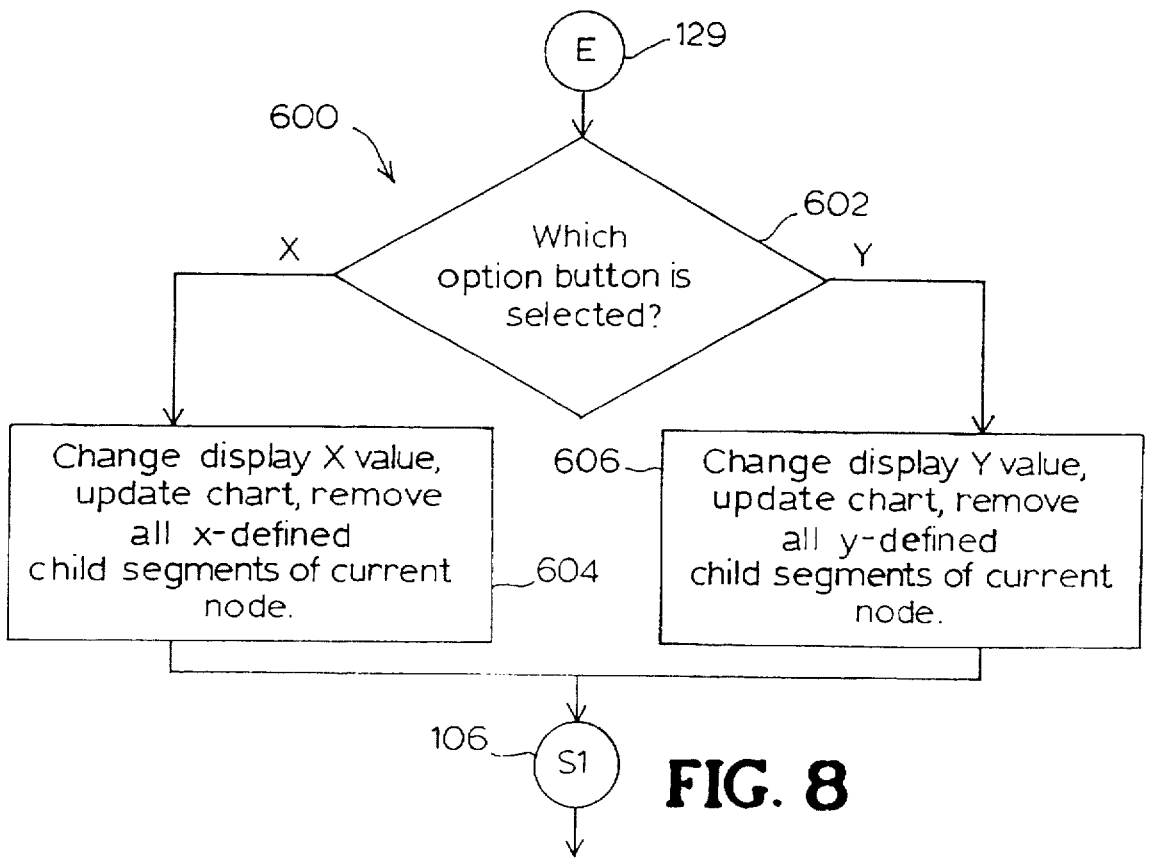

Of course, other x-axis and y-axis variables can be selected to change the relationship shown and update the chart 604, 606 (FIG. 8). If two or more variables from different data tables are chosen for the axes of a single chart, as may be the case with data from a relational database, the present invention performs a join operation. If the common variables and join options have been previously identified, the join will occur on-the-fly. Otherwise a dialogue box, drop-down menu or the like will be used to identify the required common variable and other join options.

Selecting alternative chart variables and chart types enables the user to browse, or visually evaluate, the data in a variety of visual modes, to better discover patterns and inspect relationships between variables and to search for specific information.

Figure 4:
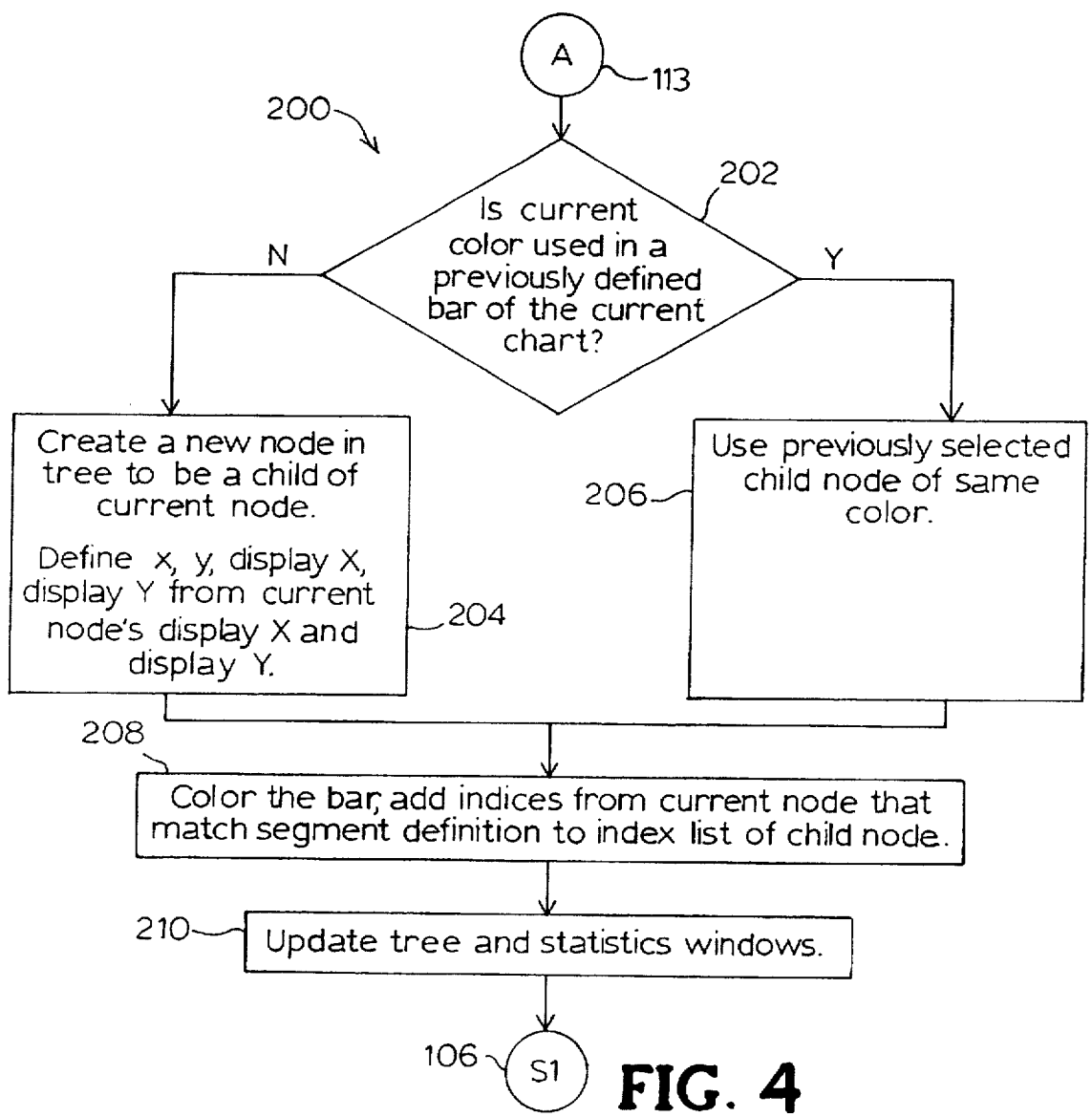

Once the data have populated the chart, one or more areas within the currently-viewed chart, referred to herein as data subsets or segments, may be defined and selected using mouse operations. If the chart is a bar or pie chart, a mouse click on a bar or pie segment 112 designates that chart component as a data subset (See FIG. 4). Click-and-drag operations are used to capture one or more individual points on a scatter plot 116 as a data subset by forming a box around the selected points (See FIG. 6). By "click and drag" it is meant that the mouse button is depressed when the cursor is over an initial portion of the data subset of the chart to be captured and the mouse is moved, "dragging" the cursor over the remaining portion of data subset to be selected, thereby defining a selected portion of the chart area. When the entire desired area is defined, the mouse button is released, ending the "click and drag" operation.

Figure 6:
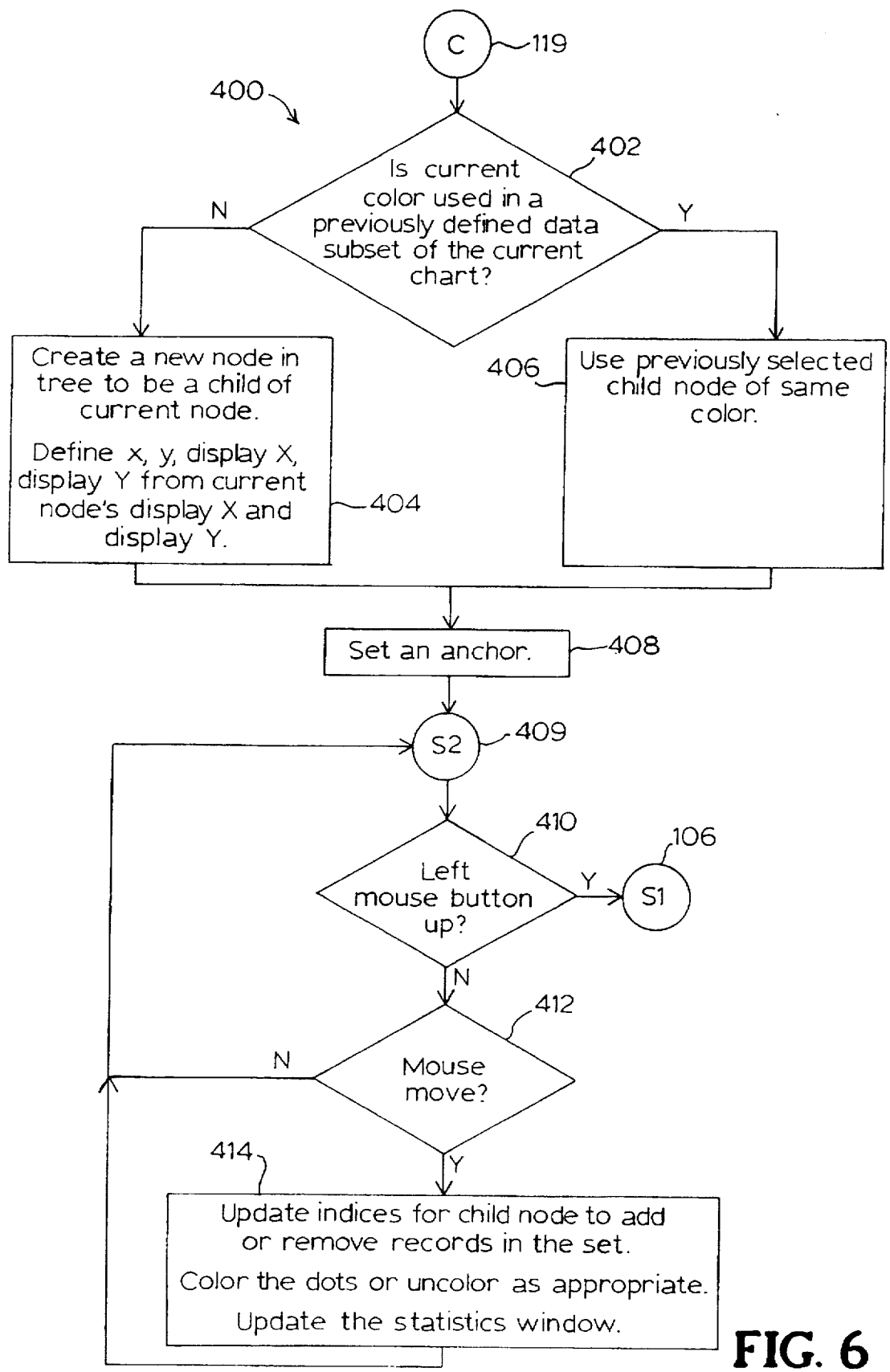

Data subsets may also be defined by clicking and dragging the mouse along or below one of the axes 120 and releasing the button which fixes the single variable range (See FIG. 6). The chart area representing each data subset selected is visually distinguished in a unique manner such as by color, pattern or other means and graphical representations of segment statistics (e.g., mean values of the segments, measures of dispersion, other statistics, as appropriate) may be added to the chart.

Noncontiguous data on the chart, such as separate bars in a bar graph, can be selected for the same data subset using the query advance attribute button 96. This is accomplished by first selecting one data subset, clicking the left mouse button over the query advance attribute button 96 to undo the automatic query color and number updating and then selecting an additional data subset to be included with the current data subset. This combines the two selections into a single data subset rather than sequential data subsets.

Figure 7:
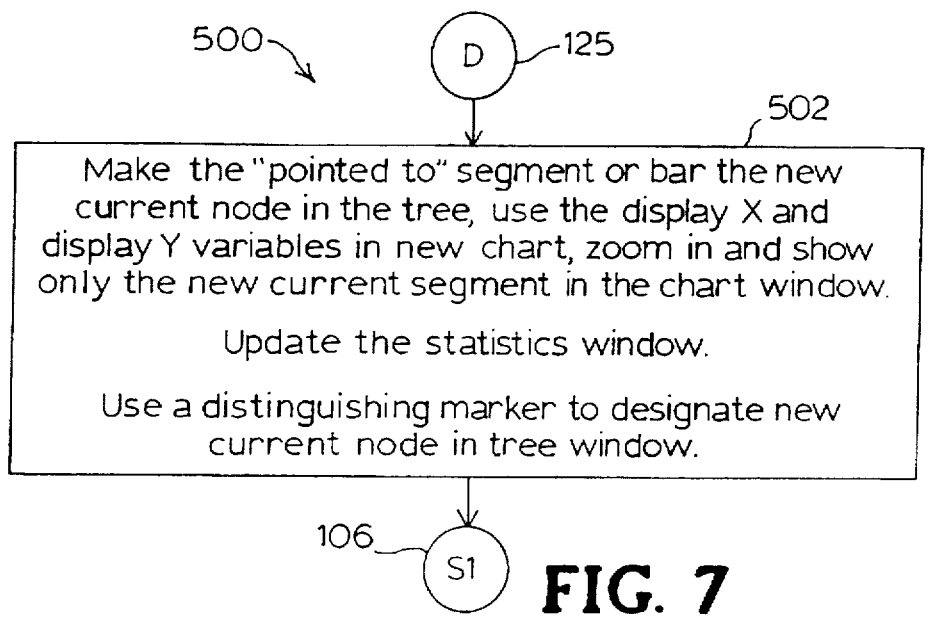

Another feature of the present invention allows the user to move the analysis to a new level which contains only the data in a particular subset. Positioning the cursor 40 with mouse movements over a data subset area of the chart and using a left mouse button 14 double click 124 advances the analysis to a new chart which includes only those records included in the selected data subset (See FIG. 7). Because the existing chart attributes selected and displayed in the Chart Window 22 are applied to the data, the visual effect is to "zoom in" on the selected data subset 502. Attributes of the new chart can be modified to visually evaluate the new data subset and to evaluate relationships among the data.

Each of these mouse operations specifies and fetches a data subset from the larger data set. In other words, this action performs a "query" solely through mouse operations entirely within the data area 30 of the chart. Thus, the present invention allows users to "capture" the object of the query, that is, the records whose variable values are consistent with the data subset, with mouse operations on an actual visual chart presentation of the data without ever having to refer or resort to a spreadsheet table or compose a query. This process may be continually reapplied by the user to conduct data evaluation and query operations, or "navigate" through the data, using any variable relationships and chart types an unlimited number of user-specified queries without ever leaving the active chart area of the display.

According to a further embodiment of the present invention, one or more other display windows are concurrently presented in "tiled" fashion on the main display. The other display windows may be used to document the query process, summarize data presented in the chart, provide navigation to charts developed in previous steps and reference and use chart-defined entities as operands in other operations. For example, simultaneous presentations of the hierarchical query structure and statistics characterizing the data in the chart may be provided for in separate query and statistics display areas referred to herein as the Query Tree Window 52 and the Statistics Window 54, respectively.

The Query Tree Window 52 and the Statistics Window 54 areas maintain current and historical information on the evolution of the chart-based queries, dynamically document the user's evaluation process, and provide a means for redirecting the analysis, or "navigating" through the data.

As shown in FIG. 2, the Query Tree Window 52 is initially empty. When the process is initialized a single node appears which is the first level on the query tree or the "root" node 56 (See FIG. 9). The "root" node represents the entire database prior to selecting data subsets or segmentation through the chart-based query process described above. Within the Query Tree Window 52, a node is added to an inverted tree structure 53 (FIG. 10) beginning with the root node 56 to represent each data subset in visual, dynamic documentation of the hierarchical database structure that evolves each time a mouse query operation is performed. Each node reflects the visual designation, by color, pattern or other means, of the data subset that is applied in the chart.

The nodes of the query tree function are all manipulable, graphical entities. Each of the nodes that are displayed in Query Tree Window 52 can be selected with a left mouse button click on the node 130 to bring up the results of that particular query (See FIG. 7) through a repositioning of the query process back to that step. Scroll bars on the right and the bottom of the Query Tree window 52 can be used to move through portions of the tree not currently displayed.

The default display for query nodes in the Query Tree Window 52 includes only the data segment number and color or other visually distinguishing representations. However, clicking on the query node display options button 93 toggles to a larger node box which includes information presented in the data subset definition of the Statistics Window 54, as will now be described. As shown in FIG. 2, the Statistics Window 54 is initially empty except for default statistics table headings 62. Within the Statistics Window 54, user-defined statistics such as the number of records, totals or averages of selected variables or other information are computed and presented for each data subset. The entries may be distinguished with a block that contains the unique visual designation used for this data subset and/or by a number, letter or other symbol representing this query both in the statistical window and the query tree. In addition to presenting useful information on the data subset, statistics entries include limiting ranges of the x-axis and y-axis variables used to define the query subset. Also, the Statistics Window 54 entries are dynamically generated; that is, as the mouse 4 is clicked and dragged with the cursor either within the data area 30 or along one of the axes, the statistics are dynamically updated providing a truly interactive query process.

The Statistics Window 54 entries show, by default, only the data segments in the current chart and the parent segments, that is, statistics for the nodes which lead directly from the "root" node. The user can, however, use the full statistics chart attribute button 94 to toggle the display to present the full set of data subsets generated during the previous steps of the data evaluation.

As thus described, during the query process, the user conducts comprehensive, flexible, visual browsing and query operations without ever leaving the active chart area of the display, defining and generating new data subsets, adding nodes to the query tree and placing additional entries in the Statistics Window 54. The dynamic updating and concurrent presentation of the Query Tree Window 52 and Statistics Window 54 provides users with a powerful, dynamic visual view of the evolution of the analysis.

The display may also include a status bar 64 for displaying the x-axis and y-axis variable values when the cursor 40 is within the data area 30 of the chart. Moving the cursor 40 across the nodes in the query tree also presents the corresponding data subset definition variables and variable ranges in the status bar 64.

The chart image, related statistics, included records, query specifications, query relationships and other information defined by the chart-based query are collectively referred to as "chart entities." Chart entities may be referenced with mouse operations on query tree nodes or on Statistics Window entries. These entities are used to create new data subsets, to copy the down-tree history of query operations to other nodes in the query tree and in mathematical operations, report generation, printing and other activities.

Figure 13:
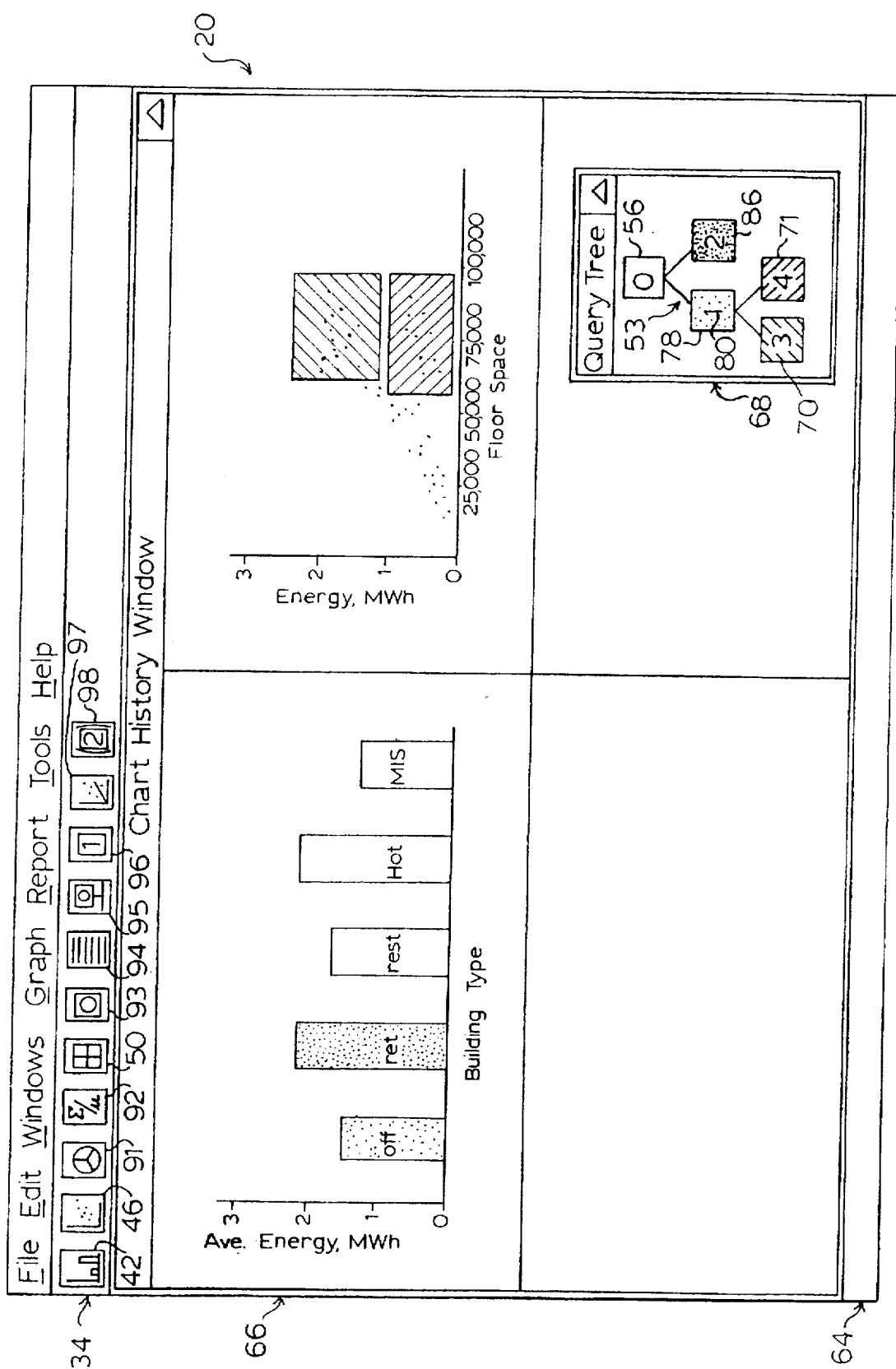
FIG. 13 illustrates the selection of the invention's Chart History Window feature after performance of the queries illustrated in FIGS. 9 through 12.

Any previously developed charts can also be selected in a tiled graph presentation to assist in data evaluation. The Chart History attribute button 50 provides this additional documentation and presentation feature. When this process is selected, the Chart History Window 66 is presented with a small Query Tree Window 68 overlay as shown in FIG. 13. The Chart History Window 66 is initially split into "empty" subwindows. The Chart History Window provides a drop-down menu option, dialogue box, or other comparable user-interactive device to change default settings such as the number of subwindows and the size of each subwindow. If the resulting screen is too large for the display, scroll bars are added to the bottom and/or right side of the window.

FIG. 13 shows a user selection of four tiled subwindows. These subwindows are populated by using the mouse to drag-and-drop the image of any Query Tree node or any Statistics Window color box to any tiled subwindow. The Chart History Window 66 allows the user to display any previously defined charts. For instance, charts associated with nodes along a single branch of the Query Tree or with nodes at the same level along different branches can be displayed with this feature. The Chart History Window 66 may be closed, hidden or resized by the user when the chart history viewing is completed. This feature provides flexibility in visually comparing graphs from any point in the analysis.

The drag-and-drop operation using query nodes to populate the Chart History Window illustrates the use of the chart entities in this invention. Whenever a chart entity is referenced within the present invention, the appropriate attributes of the chart entity are used to complete the operation. In the case of the Chart History Window 66, the chart image is displayed in the tiled subwindow.

Alternative query tree hierarchies can be developed by selecting the new tree icon 95 which generates a new root node adjacent the existing query tree(s) in the Query Tree Window 52. A new independent analysis can be initiated by clicking on the new root node and then performing the browsing and querying operations described above. These operations are documented with the same Query Tree and Statistics Window procedures described above.

The analysis can be repositioned to any previous point in the process by operating with the mouse on one of the Statistics Window 54 color-coded boxes 132 or the nodes of the query tree 130. Using this operation, the results of the previously executed steps can be reviewed or revised (See FIG. 7).

Figure 5:
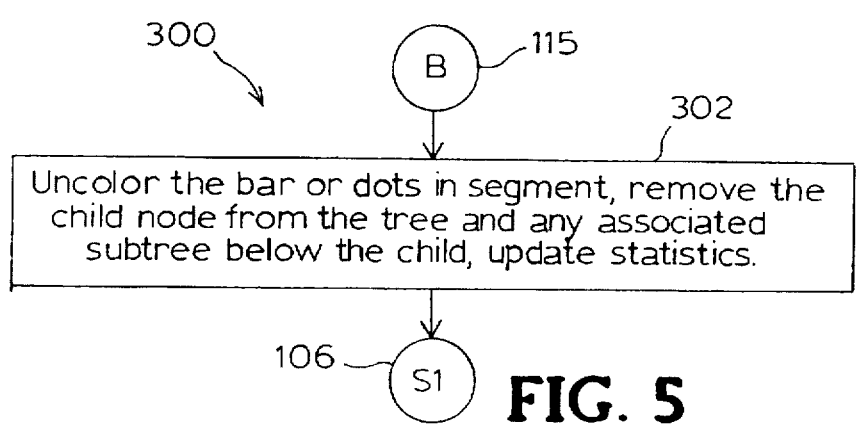

If the data subsets are revised, child charts and statistics entries below that point are automatically updated to correspond to new data subset definitions. Data subsets or "query definitions," are revised by repeatedly selecting the query advance icon tool bar button 96 to move the current data subset color and number designation to the data subset to be revised, selecting a new data subset and, if desired, deleting the old subset using a right mouse button click over the old subset 114 (See FIG. 5). If data subsets are deleted, child statistics and nodes are deleted and their representations are removed from their respective windows. Each time the query advance icon is selected, the current data subset changes to designate another of the previously defined subsets shown on the current chart. The current data subset designation is indicated by a visually distinctive color outlining of the data subset area.

If the analysis is repositioned and segments are redefined using different variables, the old down-tree segments will be discarded to make room for new data subset definitions (See FIG. 8). This feature is part of the present invention which prevents data records from belonging to more than one data subset in the same level, thereby presenting an unambiguous hierarchical query tree and statistics entry development. However, other embodiments of the present invention can be applied to allow multiple branches running from each query node to represent alternative query variable selections at the same level.

Chart entities may also be applied to create new data subsets. This operation includes first clicking on a query tree node and dragging a copy of its image to the new data subset area represented by an adjacent unused portion of the Query Tree Window 52 and then clicking on the query node operations attribute button 98. A dialogue box or other comparable user-interactive device may be used to identify a query operation such as a "union" which combines records from two or more data subsets into a single data subset. Another drag and drop operation is then performed to copy the image of another query tree node to the same new data subset area of the Query Tree Window 52.

Upon completion of this operation, a dashed-line box encompasses the images of the two node operands and a union operation symbol in the new data subset area of the Query Tree Window 52. This new data subset includes all records from the data subsets identified by the two nodes. Clicking the left mouse button on the dashed-line box enables the user to reposition the analysis to the new data subset and to conduct all charting and querying operations on the new data subset just as if it were a new root node.

The following non-limiting example application illustrates the implementation of this invention with a visual evaluation of data from a survey of electric utility customers. These data may be used with the process of the present invention, for example, to develop forecasts of future energy use and to evaluate marketing programs.

Figure 9:
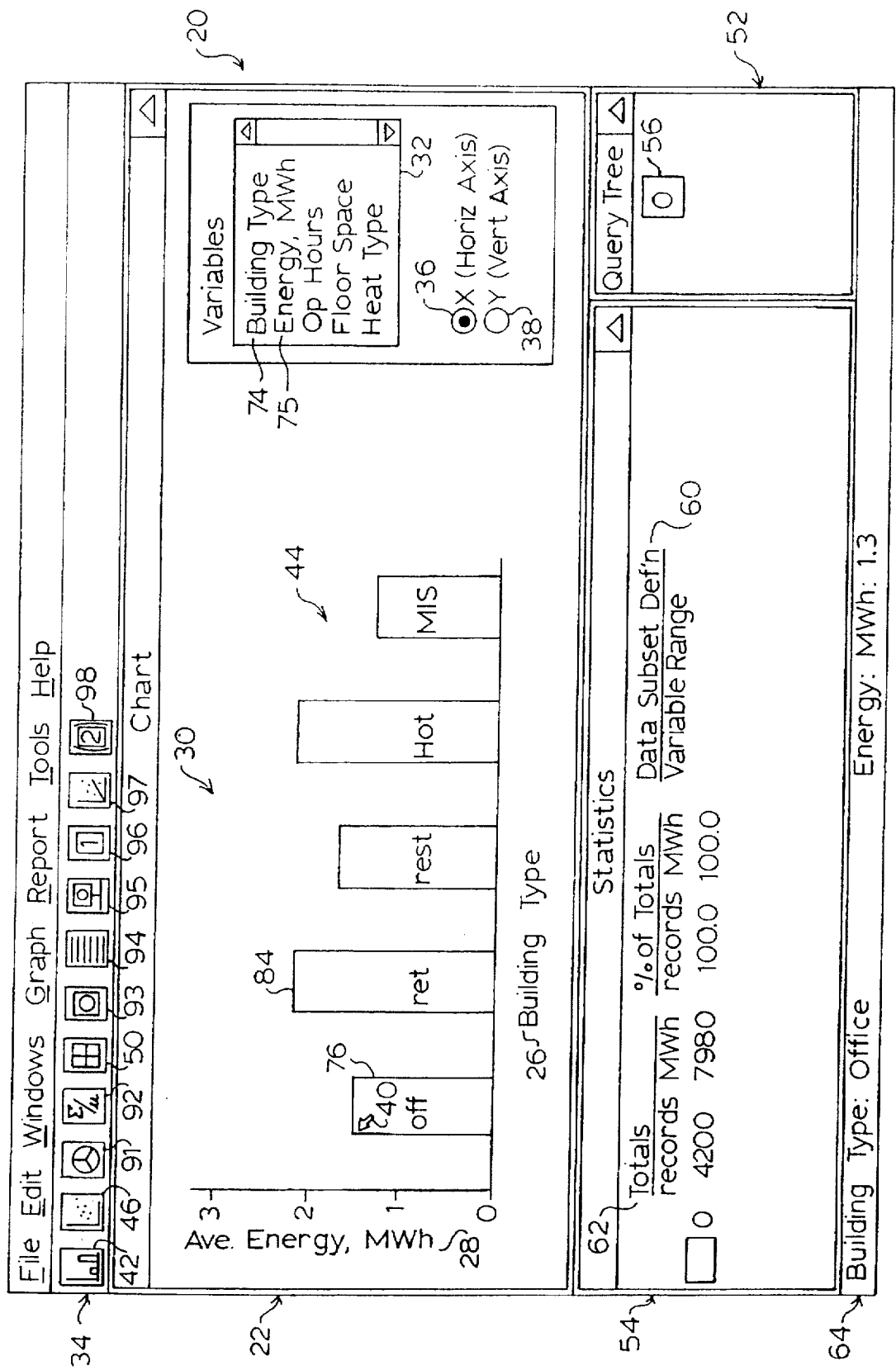
FIGS. 9 through 12 illustrate a progressive example of visual data evaluation according to an embodiment of the present invention.

FIG. 9 shows the contents of the three windows after selecting a chart and chart variables. The data appear in the data area 30 in a bar chart 44 after clicking the left mouse button 14 on the bar chart icon 42 and after populating the bar chart by clicking on the x-axis option button 36 designating the x-axis and the variable label "building" 74 in the variable label list box 32, and after clicking on the y-axis option button 38 designating the y-axis and the label "energy" 75 in the variable label list box 32. The value on the y-axis shows the mean or average customer energy use in each building category. The sum/mean attribute button 92, can be selected to toggle the display to show the category total of the y-variable.

The bar chart 44 has been constructed within the data area 30 and the selected "x" 26 and "y" 28 variable labels are displayed along the respective axes. The building type and energy data in this example are actually stored in two separate tables. Building type is part of the survey data table while energy use is part of the billing table, developed independently from utility billing data files. Selecting these two variables generated an on-the-fly join of the tables where the customer account variable (not shown) was the "key" variable common to both tables. Choosing other x-axis variable labels reveals relationships between these new variables and energy use. Similarly, other y-axis variable labels can be selected to examine their building-specific values and relationships across the building types. Of course, any of the different x-axis and y-axis variables can be selected for visual evaluation. Since a bar chart requires an x-axis variable represented by categories, this invention automatically segments continuous variables into a set of categories.

When the cursor 40 is within the data area 24 of the bar chart 44, the x-axis and y-axis variable values are displayed on the status bar 64. In FIG. 9, the cursor 40 is over the office bar 76 at a y-axis value of 1.3 MWh (MegaWatt hours).

Since all records in the database are used to populate the initial chart, the Statistics Window 54 contains information on the entire database. Total customers and annual energy and the percent of the total reflected in the current chart are displayed as default statistics. These variables and display options can be changed by the user via user-interactive means such as a dialogue box, drop down menu, and the like. Since there are no data subsets at this point, there are no Data Subset Definition 60 entries. The Query Tree Window 52 contains a single node 56 which represents the "root" of the tree, the entire database prior to selecting data subsets through the chart-based query process.

The chart type can easily be changed. For example, if the scatter plot icon 46 is selected, one "dot" will appear in the data area 30 to reflect the x-axis and y-axis variable values for each record in the database. As with the bar chart or any other chart type, alternative selections of x-axis and y-axis variables will present scatter plots for each of the user-selected x-axis/y-axis combinations.

Figure 10:
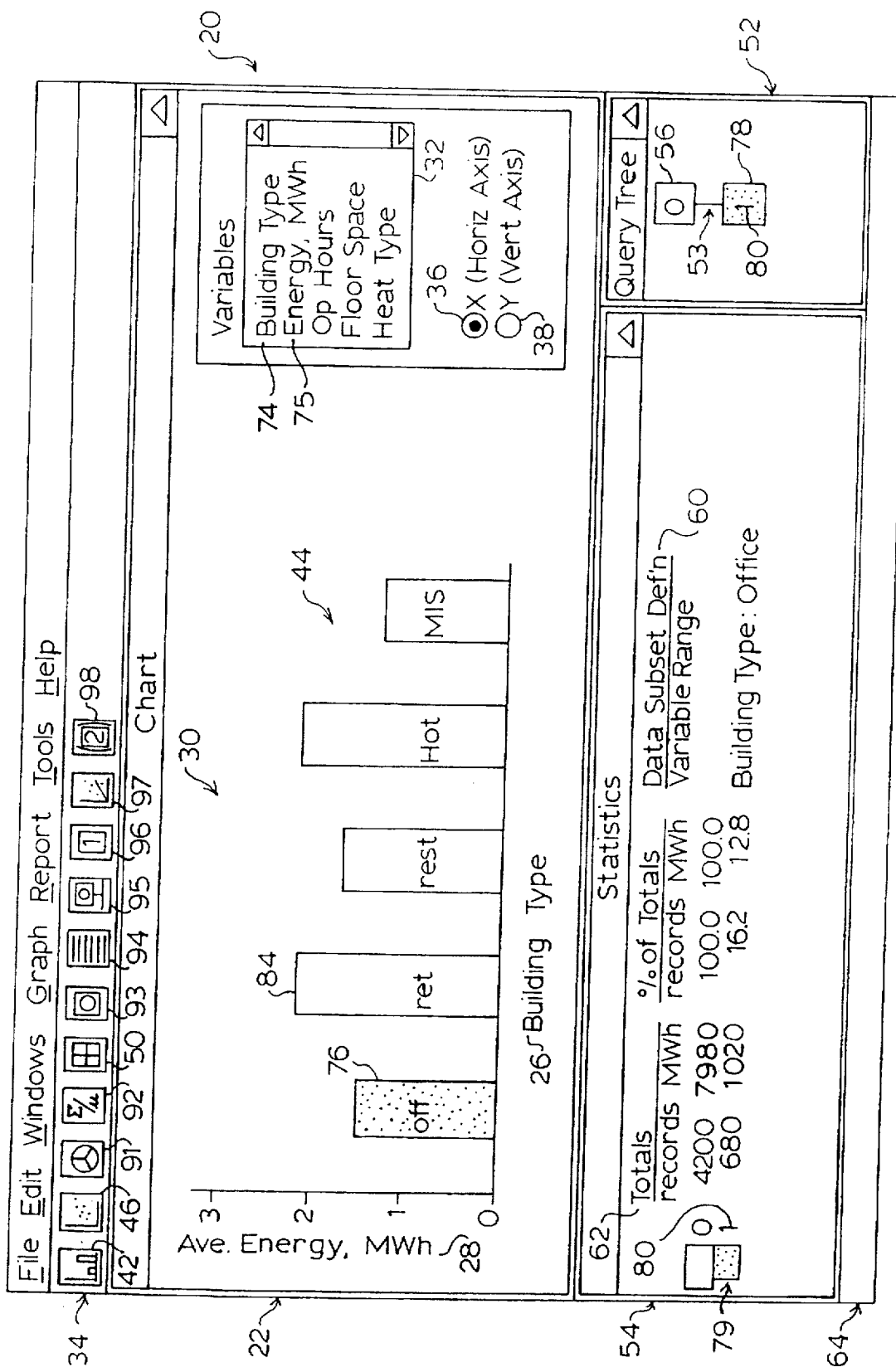

FIG. 10 shows the contents of the three windows after selecting an office data subset by clicking the left mouse button while the cursor 40 is positioned over the "office" bar 76. In a preferred embodiment of the present invention, this selection is visually characterized by a unique color, indicated in FIG. 10 with shading on the office bar 76 of the bar chart 44.

At the same time that the office bar 76 is selected, a second node 78 is added to the query tree to represent the office data subset selection, the "query," and an entry 79 is added to the Statistics Window 54 to provide the summary statistics for the office data subset. The query tree 53 is developed with lines or branches running from a single "parent" node to one or more "child" nodes. Note that the width of the color-coded boxes, shown in FIG. 10 with shading or stippling, indicate the level of the data subsets in the query hierarchy as depicted in the query tree.

FIG. 10 shows that the color mapping used for data subsets and nodes are also applied as box backgrounds in the Statistics Window 54 to map to statistics entries. A data subset number 80 is assigned and documented on the query node 78 and in the statistics entry 79. In this example, only the x-axis variable value "building type" was used to define the data subset so the data subset definition includes only information on the building type selection which is "office."

Figure 11:
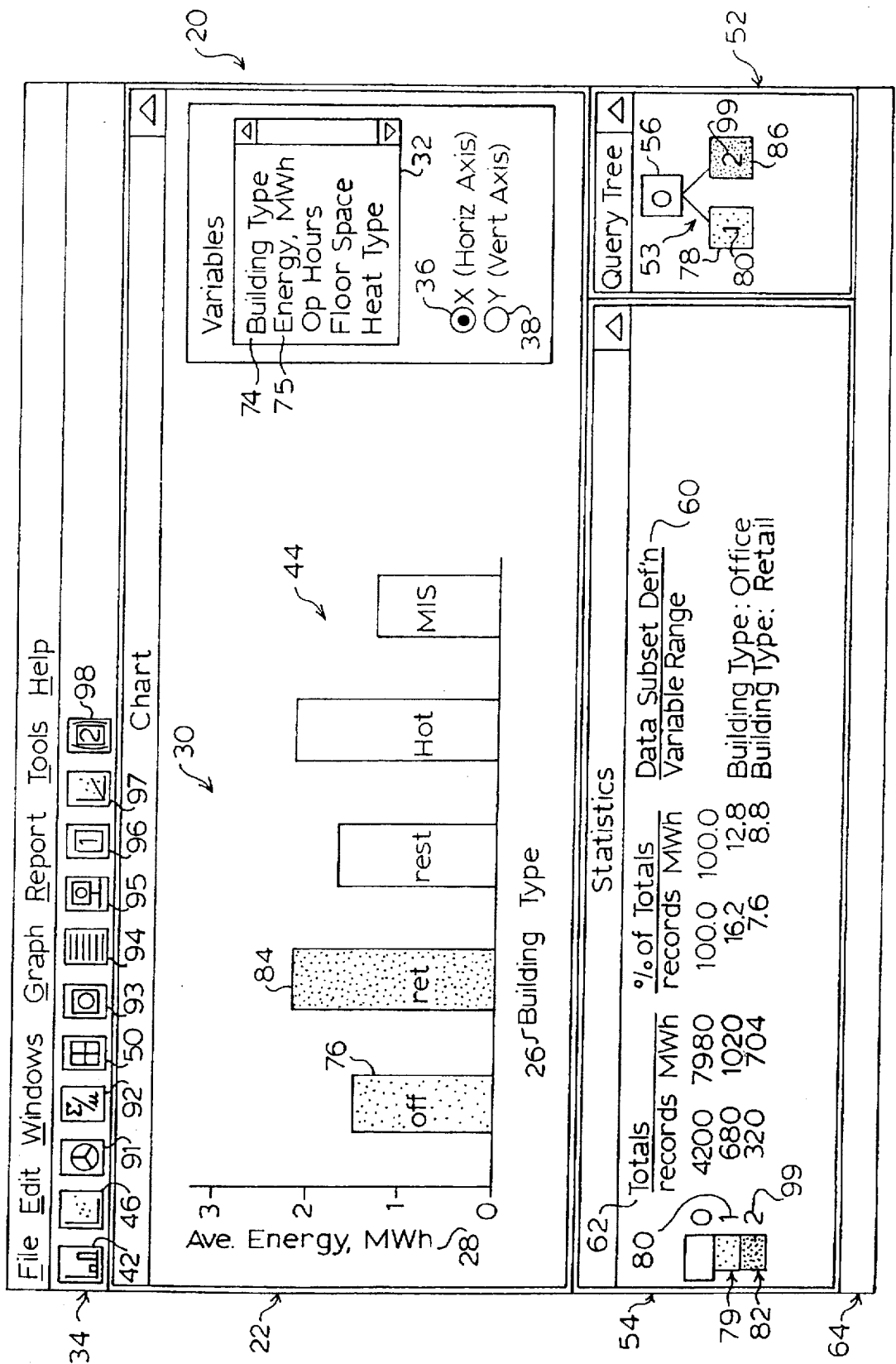

FIG. 11 shows the contents of the three windows after selecting another data subset by clicking the mouse 4 while the cursor 40 is positioned over the "retail" bar 84. This selection is also characterized by a unique color, indicated in FIG. 11 with shading on the retail bar 84 of the bar chart 44. At the same time that the retail bar 84 is selected, a third node 86 is added to the query tree 53 to represent the retail data subset selection, or "query," and an entry 82 is added to the Statistics Window 54 to provide the summary statistics for the retail data subset 84. As indicated in FIG. 11, the third node 86 is also assigned a unique data segment number 99 which is recorded in the query tree node 86 and the Statistics Window 54 entry 82.

Double clicking with the left mouse button 14 while the cursor 40 is positioned over the "office" bar 76 of the bar chart 44 selects the office data subset for further analysis. That is, the analysis "zooms in" on database records which have building type values of "office." For example, FIG. 12 shows the office subset using a scatter plot of energy (y-axis variable) 28 and floor space (x-axis variable) 26 to display the relationship between office building energy use and office building size.

Figure 12:
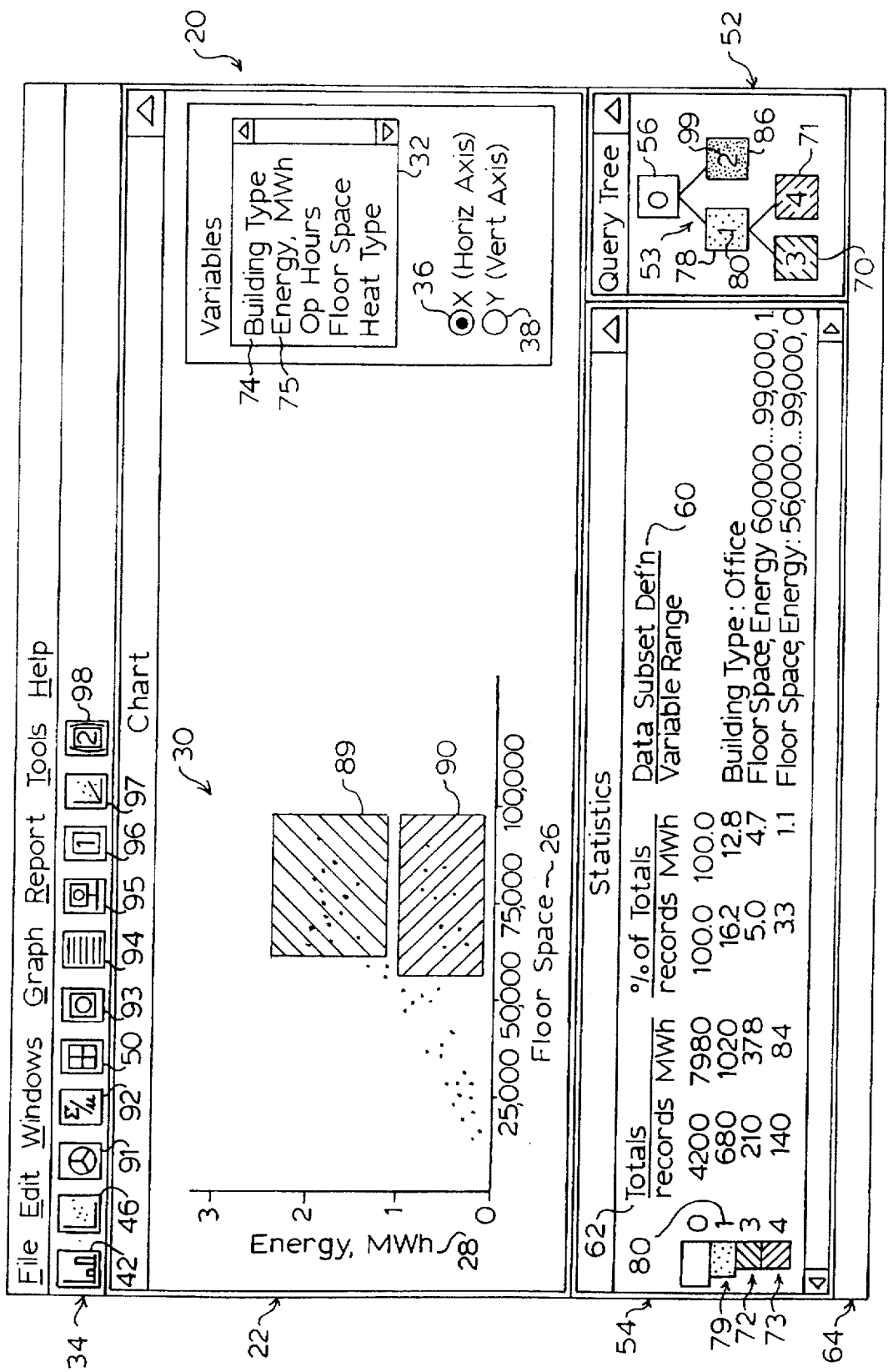

FIG. 12 also shows the selection of two data subsets 89, 90 within office buildings characterized by energy use and floor space variable ranges. These records are captured by a click and drag operation in which the left mouse button is depressed and while depressed the mouse is dragged to open a rectangular area which is fixed when the mouse button is released. The queries pictured in FIG. 12 produce two new query nodes 70, 71 and statistics window entries 72, 73.

The analysis can be repositioned to any previous point by clicking the mouse on one of the Statistics Window color-coded boxes or one of the Query Window nodes of the query tree. For instance, clicking on the root node "0" 56 would reposition the user to the chart presented in FIG. 11. From that point, the results of the previously-executed steps can be reviewed or revised. If the chart data subsets are revised, child charts and statistics entries below that point are automatically updated to correspond to new data subset definitions.

The drag-and-drop query node operation may be used to copy the down-tree history of the prior query operations to other nodes in the query tree. If a drag-and-drop mouse operation were used to move a copy of query node "1" 78 to query node 2 in FIG. 12, then query nodes 5 and 6 (not shown) would automatically appear below query node "2" 86 in the Query Tree Window 52. Clicking on node "2" would now show a scatter plot of retail buildings with the same data segments defined by the chart in FIG. 12 while statistics for these data subsets would also appear in the Statistics Window 54. While various mouse or other pointer operations could be defined to perform various steps according to the invention, this dragging of the query node is preferably used to duplicate the down stream queries on the data subset represented by the dragged query node. This exercise is to be distinguished from the exercise described above wherein two query nodes are consecutively dragged to the same open area in the Query Tree Window 52 to form a new data subset.

FIG. 13 shows an application of the Chart History Window 66 using four subwindows. User mouse drag-and-drop operations have been performed with query tree nodes numbers "0" and "1" 56, 78 in the Query Tree Window 68 overlay to populate two of the subwindows. An unlimited number of windows with user-selected sizes can be created to conduct flexible and comprehensive visual analysis of previously-developed charts. In another embodiment of the invention, queries could be performed from the chart history window.

The browsing and querying process described with FIGS. 9–13 broadly illustrates the progression of activities undertaken in visual data evaluation. The features of this invention accomplish these activities with mouse cursor operations operating within a single chart paradigm and operating only on the data area of the chart window. User conceptual orientation is maintained by operating within a single chart area and with immediate query results and concurrent, dynamic documentation of the query evolution visible in the Statistics and Query Tree Windows.

The previously described versions of the present invention have many advantages, including the provision of a simple method for visually evaluating complex databases with features which compensate for human cognitive limitations. The method allows the user to access and manipulate a database in real time, viewing, evaluating and navigating, by means of a simple query process, through data presented on the display.

The method frees the user from having to learn formal query language or other procedures which are translated into query language; consequently it also frees the user from limitations imposed by the expressive capacity of existing query languages.

Instead of requiring the user to repetitively complete separate data query, data manipulation, chart definition and chart presentation steps, the method provides on-the-fly viewing, evaluation and querying with simple operations on a single dynamic representation of the database.

Moreover, the system works with all databases regardless of the database management approach. For instance, the present invention automatically "joins" tables in a relational database when two or more variables from different data tables are chosen for the axes of a single chart.

The present invention also includes the simultaneous generation of hierarchical tree summaries of the browse and query operations and a statistical summary which reports information for each step in the user-guided browsing and querying process.

While the present invention has been described in considerable detail in connection with particular embodiments thereof, other versions are possible. It will be understood, of course, that I do not intend to limit the invention to those embodiments since modifications may be made by those skilled in the art, particularly in light of the foregoing teachings. For example, this invention can be applied to databases consisting entirely of non-numerical variables or data items, or it can be applied to representations of data presented on a geographic map format. I intend to cover all alternatives, modifications and equivalents as may be included within the spirit and scope of the invention as defined by the appended claims. It is, therefore, contemplated by the appended claims to cover any such modifications as incorporate those features which constitute the essential features of these improvements within the true spirit and the scope of the invention. Therefore, the spirit and scope of the appended claims should not be limited to the description of the embodiments contained herein.

I claim:

1. A method in a data processing system for accessing information in a data set, the data set information accessing method comprising the steps of:
    creating a visual chart representation of the data set and displaying the data set in the chart;
    selecting a second data set which is a subset of the displayed data set through interaction between the user and the system within the chart of the data set;
    developing information from the second data set substantially simultaneously during the data subset selection step; and
    displaying the results of the data subset selecting step, wherein any subset of the second data set may be selected in succeeding data selection steps.

2. A data set information accessing method as recited in claim 1, wherein the step of creating a visual chart representation of the data set comprises selecting a chart attribute.

3. A data set information accessing method as recited in claim 2, wherein the step of selecting a chart attribute comprises selecting a data set variable.

4. A data set information accessing method as recited in claim 3, wherein the step of selecting a data set variable further comprises the steps of selecting data set variables from different sources of data and automatically joining the sources of data.

5. A data set information accessing method as recited in claim 1, wherein the step of selecting the data subset comprises defining the data subset in response to movements of a means for controlling a cursor.

6. A data set information accessing method as recited in claim 5, wherein the step of creating a visual chart representation of the data set comprises selecting a data set variable, further comprising the step of displaying the variable value indicated by the position of the cursor control means within the chart of the data set.

7. A data set information accessing method as recited in claim 1, wherein the step of displaying the results of the data subset selecting step comprises visually distinguishing the displayed data subset from the displayed data set and from any other subsets of the second data set.

8. A data set information accessing method as recited in claim 7, wherein the step of visually distinguishing the displayed data subset comprises visually distinguishing the data subset by color.

9. A data set information accessing method as recited in claim 1, further comprising the steps of:
    selecting the data subset through interaction between the user and the system within the displayed data subset; and
    displaying a chart of the data subset.

10. A data set information accessing method as recited in claim 9, further comprising the steps of changing a chart attribute and displaying a chart of the data subset.

11. A data set information accessing method as recited in claim 10, wherein the step of changing the chart attribute comprises selecting a data set variable.

12. A data set information accessing method as recited in claim 10, further comprising the steps of:
    selecting additional data subsets which are subsets of previously selected and displayed data subsets through interaction between the user and the system within the charts of the previously selected and displayed data subsets; and
    displaying the results of the additional data subsets selecting step.

13. A data set information accessing method as recited in claim 9, further comprising the steps of:
    selecting a second data subset which is a subset of the displayed data subset through interaction between the user and the system within the chart of the displayed data subset; and
    displaying the results of the second data subset selecting step.

14. A data set information accessing method as recited in claim 1, further comprising:
    displaying a menu bar having a command option, the command option generically representing an operator;
    selecting the command option; and
    performing and displaying the result of the operation on the displayed data set.

15. A data set information accessing method as recited in claim 1, further comprising the step of maintaining a record of the selected data subset.

16. A data set information accessing method as recited in claim 15, further comprising the step of associating a distinct visual symbol with the data subset record.

17. A data set information accessing method as recited in claim 16, wherein the step of displaying the results of the data subset selecting step comprises visually distinguishing the displayed data subset, and
    further comprising the step of visually distinguishing the distinct visual symbol in a manner similar to the visual distinction of the associated data subset.

18. A data set information accessing method as recited in claim 16, further comprising the step of using the distinct visual symbol as a software button for selecting and displaying the associated data subset.

19. A data set information accessing method as recited in claim 18, further comprising:
    displaying a menu bar having a command option, the command option generically representing an operator;
    selecting the command option;
    using the distinct visual symbol as a software button for selecting the associated data subset as an operand in the operation; and
    performing the operation on the data subset.

20. A data set information accessing method as recited in claim 15, wherein the step of maintaining a record of the user selected data subset comprises the steps of:

creating a record of the data subset;

creating and displaying a distinct visual symbol for each of the data set and the data subset; and arranging the displayed visual symbols in a network of interconnected visual symbols representing the structural hierarchical relationship among the data set and the data subset as defined by the data subset selecting step.

21. A data set information accessing method as recited in claim 20, the method further comprising the steps of:

creating and displaying a plurality of windows;

using the distinct visual symbol for selecting for display the associated data subset; and displaying the data subset in one of the plurality of windows.

22. A data set information accessing method as recited in claim 15, wherein the step of maintaining a record of the user selected data subset comprises the steps of:

creating a textual record and values of chart attributes which define the data set and data subset;

displaying the textual record for each of the data set and the data subset; and arranging the textual records to represent the structural hierarchical relationship among the data set and the data subset as defined by the data subset selecting step.

23. A data set information accessing method as recited in claim 22, further comprising the step of displaying a textual record of the data set and the values of chart attributes of the data subset with the user operations within the chart of the data set.

24. A method in a data processing system for maintaining a record of a user selected data subset selected from a data set, the data subset record maintaining method comprising the steps of:

creating a record of the data set and the data subset;

creating and displaying a distinct visual symbol for each of the data set and the data subset; and arranging the displayed visual symbols in a network of interconnected visual symbols representing the structural hierarchical relationship among the data set and the data subset as defined by the data subset selecting step, wherein the steps of the data subset record maintaining method occur substantially simultaneously with user data subset selection.

25. A data set record maintaining method as recited in claim 24, further comprising:

using the distinct visual symbol to select for display the associated data subset; and displaying the data subset.

26. A data set record maintaining method as recited in claim 24, further comprising:

maintaining a visual chart representation of the data set and displaying the data set in the chart;

receiving and processing additional data subset selections through interaction between the user and the system within the chart of the data set;

creating records of the additional data subsets;

creating and displaying distinct visual symbols for each of the additional data subsets; and arranging the distinct visual symbols in a network of interconnected visual symbols to indicate the structural hierarchical relationship among the data set and the data subsets as defined by the data subsets selections.

27. A data set record maintaining method as recited in claim 26, further comprising:

using the distinct visual symbol to select the associated data subset for display;

displaying the data subset; and receiving and processing additional data subset selections through interaction between the user and the system within the chart of the displayed data subset.

28. A method in a data processing system for maintaining a record of a user selected data subset selected from a data set, the data subset record maintaining method comprising the steps of:

creating a textual record of and values of chart attributes which define the data set and data subset;

displaying the textual record for each of the data set and the data subset; and arranging the textual records to represent the structural hierarchical relationship among the data set and the data subset as defined by the data subset selecting step, wherein the steps of the data subset record maintaining method occur substantially simultaneously with user data subset selection.

29. A data set record maintaining method as recited in claim 28, further comprising the step of creating a distinct visual symbol for the textual record of the data subset.

30. A data set record maintaining method as recited in claim 29, further comprising the steps of:

using the distinct visual symbol to select the associated data subset for display; and displaying the data subset.

31. A data set record maintaining method as recited in claim 28, further comprising the steps of:

maintaining a visual chart representation of the data set and displaying the data set in the chart;

receiving and processing additional data subset selections through interaction between the user and the system within the chart of the data set;

creating textual records of the additional data subsets and values of chart attributes which define the data subsets;

creating and displaying distinct visual symbols for each of the additional data subsets, wherein the visual symbols for data subsets in the same level of the data subsets selecting hierarchy share a common feature; and arranging the textual records and displayed visual symbols to represent a structural hierarchical relationship among the data set and the data subsets as defined by the data subset selections.

32. A data set record maintaining method as recited in claim 31, further comprising:

using the distinct visual symbol to select the associated data subset for display;

displaying the data subset; and receiving and processing additional data subset selections through interaction between the user and the system within the chart of the displayed data subset.

33. A data processing system for accessing information in a data set, the data set information accessing system comprising:

means for creating a visual chart representation of the data set;

means for selecting a data set which is a subset of the displayed data set through interaction between the user and the system within the chart of the data set;

means for developing information from the second data set substantially simultaneously during the data subset selection step; and means for displaying the results of the data subset selection, wherein any subset of the second data set may be selected in succeeding data selection steps.

34. A data set information accessing system as recited in claim 33, wherein the means for creating a visual chart representation of the data set comprises means for selecting a chart attribute.

35. A data set information accessing system as recited in claim 34, wherein the chart attribute selecting means comprises means for selecting a data set variable.

36. A data set information accessing system as recited in claim 33, wherein the means for selecting the data subset comprises means for generating a data subset in response to movements of a means for controlling a cursor.

37. A data set information accessing system as recited in claim 35, further comprising:

means for selecting the data subset through interaction between the user and the system within the displayed data subset; and means for displaying a chart of the data subset.

38. A data set information accessing system as recited in claim 33, further comprising means for creating and maintaining a record of the selected data subset.

39. A data set information accessing system as recited in claim 38, wherein the means for maintaining a record of the user selected data subset comprises:

means for creating and displaying a distinct visual symbol for each of the data set and the data subset; and means for arranging the displayed visual symbols in a network of interconnected visual symbols representing the structural hierarchical relationship among the data set and the data subset as defined by the data subset selecting step.

40. A data set information accessing system as recited in claim 38, wherein the means for maintaining a record of the user selected data subset, comprises:

means for creating a textual record and values of chart attributes which define the data set and data subset;

means for displaying the textual record for each of the data set and the subset; and means for arranging the displayed textual records to represent the structural hierarchical relationship among the data set and the data subset as defined by the data subset selection.

* * * * *

UNITED STATES PATENT AND TRADEMARK OFFICE
CERTIFICATE OF CORRECTION

PATENT NO.       : 5,894,311
APPLICATION NO.  : 08/567925
DATED            : April 13, 1999
INVENTOR(S)      : Jerry R. Jackson Page 1 of 3

It is certified that error appears in the above-identified patent and that said Letters Patent is hereby corrected as shown below:

Cover Page, Section [73] Assignee:
Line 2: change "Hill" to -- Hill, N.C. --.

Cover Page, Section [56] References Cited, U.S. Patent Documents:
Column 1, line 7 thereof: change "Miesel" to -- Meisel --.

Column 17:
Line 28: change "chart" to -- visual chart representation --;
Line 30: change "the" to -- a --;
Line 31: change "chart of the" to -- visual chart representation of the displayed --;
Line 33: change "selection" to -- selecting --;
Line 35: delete "the" (first occurrence);
Line 52: delete "a" (first occurrence);
Line 56: change "the" (last occurrence) to -- a --;
Line 57: change "the" (first occurrence) to -- a --; and change "control" to
-- controlling --; and
Line 58: change "chart" to -- visual chart representation --.

Column 18:
Line 9: change "a" to -- the --;
Line 17: delete "the" (last occurrence);
Line 33: change "operator" to -- operation --;
Line 35: after "performing" insert -- the operation --;
Line 53: change "the" to -- an--;
Line 57: change "operator" to -- operation --;
Line 62: after "on the" insert -- selected --; and
Line 65: delete "user".

Column 19:
Line 1: after "of the" insert -- selected --;
Line 3: after "and the" insert -- selected --;
Line 7: after "the" (first occurrence) insert -- selected --;
Line 10: delete "the method";
Line 13: change "associated" to -- selected --;
Line 14: after "the" (first occurrence) insert -- selected --;
Line 18: delete "user";

UNITED STATES PATENT AND TRADEMARK OFFICE
CERTIFICATE OF CORRECTION

PATENT NO. : 5,894,311
APPLICATION NO. : 08/567925
DATED : April 13, 1999
INVENTOR(S) : Jerry R. Jackson It is certified that error appears in the above-identified patent and that said Letters Patent is hereby corrected as shown below:

Column 19 (continued):
Line 20: after "and" insert -- the selected --;
Line 22: after "the" insert -- selected --;
Line 24: after "the" (last occurrence) insert -- selected --;
Line 27: change "a" to -- the --;
Line 29: delete "the" (first occurrence); and change "chart" to -- visual chart representation --;
Line 41: after "the" (last occurrence) insert -- user --;
Line 42: change "selecting step" to -- selection --;
Line 44: after "with" insert --the--;
Line 49: delete "associated";
Line 54: change "chart" to -- visual chart representation --; and
Line 57: change "chart" to -- visual chart representation --.

Column 20:
Line 3: delete "associated";
Line 8: change "chart" to -- visual chart representation --;
Line 19: after "the" insert -- user --; and change "selecting" to -- selection. --;
Line 20: delete in its entirety;
Line 22: after "with" insert -- the --;
Line 29: delete "associated";
Line 35: change "chart" to -- visual chart representation --;
Line 38: change "chart" to -- visual chart representation --;
Line 43: change "the" (first occurrence) to -- a --;
Line 51: delete "associated";
Line 56: change "chart" to -- visual chart representation --;
Line 62: after "a" (first occurrence) insert -- second --;
Line 63: change "the" to -- a --; and
Line 64: change "chart" to -- visual chart representation --.

Column 21:
Line 2: delete "the";
Line 3: delete "step";
Line 4: delete "the" (first occurrence);
Line 6: change "selection steps" to -- subset selections --;
Line 16: change "a" to -- the --; and
Line 17: delete "a" (first occurrence).

UNITED STATES PATENT AND TRADEMARK OFFICE
CERTIFICATE OF CORRECTION

PATENT NO. : 5,894,311
APPLICATION NO. : 08/567925
DATED : April 13, 1999
INVENTOR(S) : Jerry R. Jackson It is certified that error appears in the above-identified patent and that said Letters Patent is hereby corrected as shown below:

Column 22:
Line 2: after "for" insert -- creating and --;
Line 10: change "selecting step" to -- selection --; and
Line 17: after "and the" insert -- data --.

Signed and Sealed this

Fifteenth Day of December, 2009

David J. Kappos
*Director of the United States Patent and Trademark Office*